United States Patent [19]

Tanahashi

[11] Patent Number: 5,270,498

[45] Date of Patent: Dec. 14, 1993

[54] ELEVATOR SPEED CONTROL APPARATUS WITH DRIVE MOTOR RESIDUAL SECONDARY MAGNETIC FLUX CONTROL

[75] Inventor: Toru Tanahashi, Inazawa, Japan

[73] Assignee: Mitsubishi Denki Kabushiki Kaisha, Tokyo, Japan

[21] Appl. No.: 704,208

[22] Filed: May 22, 1991

[30] Foreign Application Priority Data

May 24, 1990 [JP] Japan ................. 2-132471

[51] Int. Cl.$^5$ .................. B66B 1/28; H02P 5/172; H02M 5/451
[52] U.S. Cl. ................... 187/116; 318/801; 363/37
[58] Field of Search .......... 187/116, 119, 112; 318/798, 805, 801, 800, 803; 363/41, 37

[56] References Cited

U.S. PATENT DOCUMENTS

| | | |
|---|---|---|
| 4,567,419 | 1/1986 | Watanabe ............. 318/798 |
| 4,624,342 | 11/1986 | Tanahashi et al. ....... 187/119 |
| 4,680,526 | 7/1987 | Okuyama et al. ........ 318/802 |
| 4,681,191 | 7/1987 | Ikejima ................. 187/119 |
| 4,749,932 | 6/1988 | Yonemoto ............. 318/759 |

Primary Examiner—R. Skudy
Assistant Examiner—Robert Nappi
Attorney, Agent, or Firm—Leydig, Voit & Mayer

[57] ABSTRACT

An elevator speed control apparatus includes an inverter connected to an AC power source so as to supply an induction motor for driving an elevator with a variable-voltage, variable-frequency AC. A contactor provided between the invertor and the AC power source. A magnetic flux computing device computes residual value of secondary magnetic flux of the induction motor while the contactor is closed. A control device divides a primary current of the induction motor into an exciting current component and a torque current component so as to perform vector control, this control device being also used to generate a forcing pattern for the exciting current component in accordance with an output of the magnetic flux computing means when the contactor is closed.

5 Claims, 7 Drawing Sheets

FIG. I

ELEVATOR SPEED CONTROL APPARATUS WITH DRIVE MOTOR RESIDUAL SECONDARY MAGNETIC FLUX CONTROL

BACKGROUND OF THE INVENTION

1. Field of the Invention

The present invention relates to an apparatus for controlling the speed of an elevator.

2. Description of the Related Art

FIG. 6 is a view showing the structure of the elevator control apparatus disclosed in Japanese Patent Laid-Open No. 60-16184. A thyristor convertor 2 is connected to a three-phase alternating Current power source 1. A transistor invertor 4 is connected to the thyristor convertor 2 through a smoothing capacitor 3. The thyristor convertor 2, the smoothing capacitor 3, and the transistor invertor 4 constitute an electric power convertor.

An induction motor 5 for driving an elevator is connected to the transistor invertor 4. A speed detector 6 for detecting the rotational speed of the induction motor 5 is connected to the induction motor 5. An electric current detector 7 is disposed between the transistor invertor 4 and the induction motor 5. A regulator 8 for controlling the electric power convertor is connected to the speed detector 6 and the electric current detector 7. The regulator 8 has an interface (I/F), a ROM, a RAM, and a CPU, and performs a comparison operation between a speed command $\omega r^*$ from a speed command device (not shown) and a detection signal $\omega r$ from the speed detector 6 affixed to the induction motor 5. The regulator 8 supplies the transistor invertor 4 with a PWM signal based on the output of the electric current detector 7.

Furthermore, a sheave 9 is coupled to the induction motor 5. A hoisting rope 11 is fitted over the sheave 9 and a deflector sheave 10. One end of the hoisting rope 11 is joined to a car 15, whereas the other end is joined to a counterweight 12. A tension pulley 13 is disposed under the above components. One end of a compensating rope 14 wound around the tension pulley 13 is joined to the car 15, the other end being joined to the counterweight 12. Also, an electromagnetic brake 16 is disposed above the external circumference of the sheave 9.

FIG. 7 is a block diagram showing the regulator 8 of FIG. 6. The regulator 8 is composed of a speed control amplifier 21, a differentiator 22, dividers 23 and 37, coefficient multipliers 24 to 28, a computing device 29 for a DC component vector, and adders 30 and 31. The regulator 8 is further composed of a vector oscillator 32, a vector multiplier 34, a vector three-phase convertor 35, and an operational amplifier 36.

The regulator 8 takes in the speed command $\omega r^*$ and a secondary magnetic flux command $\phi_2^*$, as well as the detection signal $\omega r$ from the speed detector 6. The detection signal $\omega r$ and the speed command $\omega r^*$ are input to the speed control amplifier 21. The value obtained by amplifying the deviation between the detection signal $\omega r$ and the speed command $\omega r^*$, is regarded as a torque command $T_M^*$. The divider 23 divides the torque command $T_M^*$ by the secondary magnetic flux command $\phi_2^*$ to determine a secondary q axis current command $i_{2q}^*$. The coefficient multiplier 24 multiplies the secondary q axis current command $i_{2q}^*$ by $L_2/M$ to determine a torque component current command $i_{1q}^*$. $L_2$ is the self-inductance of a secondary rotor winding, and M is the mutual inductance of a primary stator winding and a secondary winding.

After the differentiator 22 has differentiated the secondary magnetic flux command $\phi_2^*$, the coefficient multipliers 26 and 25 multiply it by $1/R_2$ and $L_2/M$, respectively. The secondary magnetic flux command $\phi_2^*$ is then input to the adder 30 in the form of an electric current. This electric current is used for forcing secondary magnetic flux proportional to a time variation rate. $R_2$ is secondary winding resistance. The coefficient multiplier 27 also multiplies the secondary magnetic flux command $\phi_2^*$ by $1/M$. The secondary magnetic flux command $\phi_2^*$ is input to the adder 30 as an exciting current to obtain secondary magnetic flux.

On the other hand, the coefficient multiplier 28 multiplies the secondary q axis current command $i_{2q}^*$ by $R_2$. The divider 37 divides the secondary q axis current command $i_{2q}^*$ by the secondary magnetic flux command $\phi_2^*$. The secondary q axis current command $i_{2q}^*$ is then input to the adder 31 in the form of a slip frequency command $\omega s^*$. The adder 31 adds the slip frequency command $\omega s^*$ to the detection signal $\omega r$ in order to determine a speed command $\omega o^*$ of the secondary magnetic flux. The speed command $\omega o^*$ is in turn input to the vector oscillator 32 which integrates it to calculate a phase $e^{j\theta o^*}$ of a primary current command.

A computing device 29 for a magnetic flux vector, on the other hand, calculates a root-mean-square value $i_1(\theta o)^*$ of the primary current command. This calculation is based on a torque component current command $i_{1q}^*$ and a magnetic flux component current command $i_{1d}^*$. The phase and the root-mean-sequare value thus obtained are multiplied by the vector multiplier 34 and the vector three-phase convertor 35 to generate three-phase primary current commands $iu^*$, $iv^*$, and $iw^*$. These three-phase primary current commands $iu^*$, $iv^*$, and $iw^*$ are output to the transistor invertor 4 via a PWM modulator 36.

The conventional elevator speed control apparatus is constructed as above. When an elevator stops, a main contactor (not shown) is opened, and the exciting current of the induction motor 5 is intercepted. However, soon after a magnetic flux current component has been intercepted, the secondary magnetic flux of the induction motor 5 does not become extinguished, but instead, attenuates at the time determined by a secondary time constant. For this reason, when the elevator is started again immediately after the main contactor has been opened, the secondary magnetic flux of the induction motor 5 does not attenuate yet to the fullest extent. Thus when the magnetic current component is forced to raise the secondary magnetic flux, the secondary magnetic flux is excited excessively. This results in a problem in that a start shock or balance variation occurs.

SUMMARY OF THE INVENTION

The present invention has been made in order to solve the above problem. Accordingly, the object of this invention is to provide an elevator speed control apparatus which is capable of preventing balance deviation.

According to the present invention, there is provided an elevator speed control apparatus comprising: an invertor connected to an AC power source so as to supply an induction motor for driving an elevator with a variable-voltage, variable-frequency AC; a contactor provided between the invertor and the AC power source; magnetic flux computing means for computing a residual value of secondary magnetic flux of the induction motor while the contactor is open; and control means for dividing a primary current of the induction motor into an exciting current component and a torque current component so as to perform vector control, the control means being also used for forcing the exciting current component in accordance with an output of the magnetic flux computing means when the contactor is closed.

DESCRIPTION OF THE PREFERRED EMBODIMENT

An embodiment of the present invention will be described below with reference to the accompanying drawings.

Figure 1:
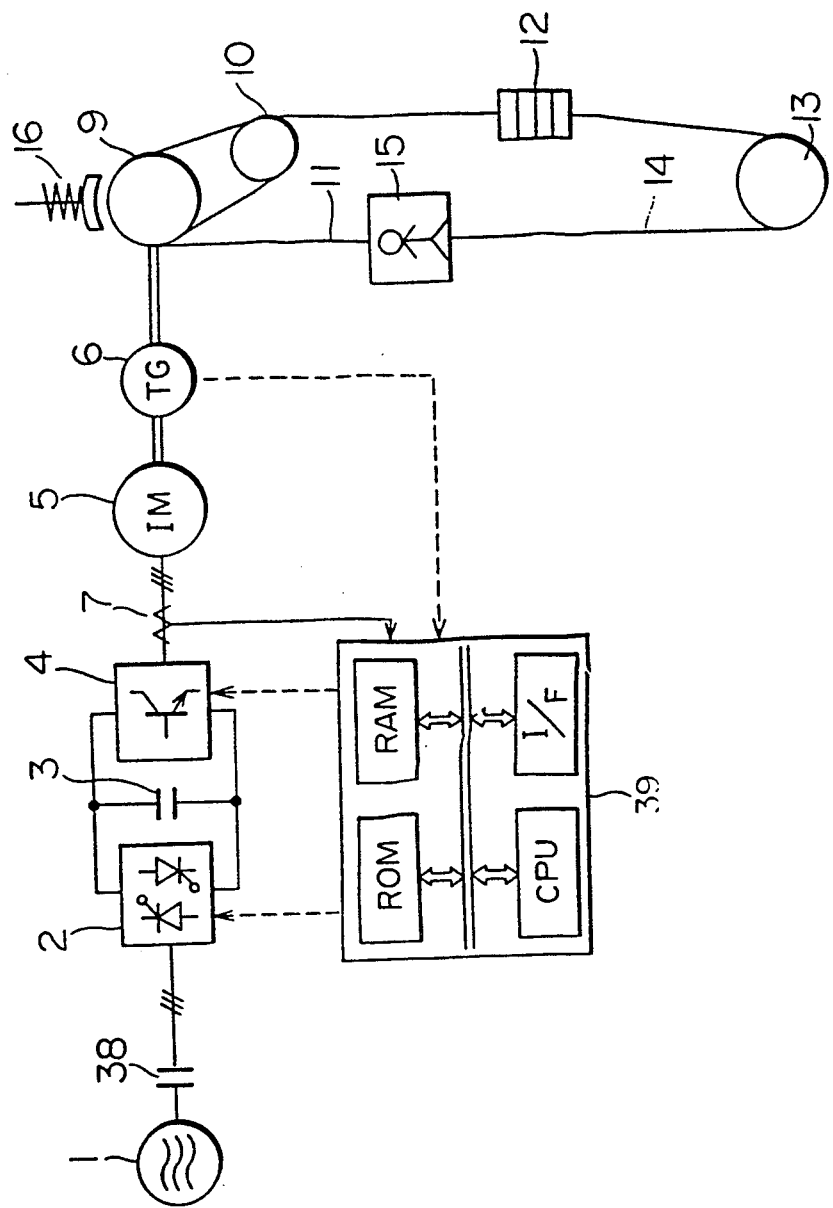
FIG. 1 is a block diagram showing an elevator speed control apparatus in accordance with an embodiment of the present invention.

In FIG. 1, a thyristor convertor 2 is connected through an electromagnetic contactor 38 to a three-phase alternating current power source 1. A transistor invertor 4 is connected to the thyristor convertor 2 through a smoothing capacitor 3. The thyristor convertor 2, the smoothing capacitor 3, and the transistor invertor 4 constitute an electric power convertor. The electromagnetic contactor 38 is opened every time an elevator stops.

An induction motor 5 for driving the elevator is connected to the transistor invertor 4. A speed detector 6 for detecting the rotational speed of the induction motor 5 is connected to the induction motor 5. An electric current detector 7 is disposed between the transistor invertor 4 and the induction motor 5. A regulator 39 for controlling the electric power convertor is connected to the speed detector 6 and the electric current detector 7.

A sheave 9 is coupled to the induction motor 5. A hoisting rope 11 is fitted over the sheave 9 and a deflector sheave 10. One end of the hoisting rope 11 is joined to a car 15, whereas the other end is joined to a counterweight 12. A tension pulley 13 is disposed under the above components. One end of a compensating rope 14 wound around the tension pulley 13 is joined to the car 15, the other end being joined to the counterweight 12. Also, an electromagnetic brake 16 is disposed above the external circumference of the sheave 9.

Figure 2:
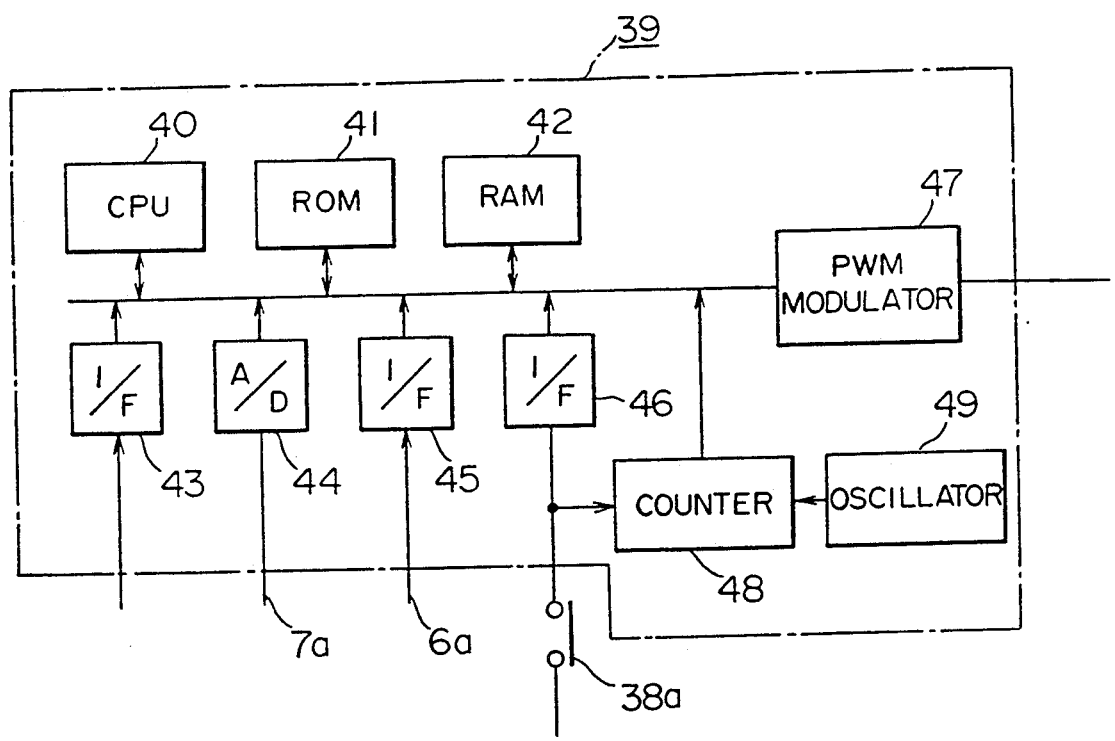
FIG. 2 is a block diagram showing the structure of a regulator employed in the embodiment of FIG. 1.

FIG. 2 specifically shows the inside structure of the regulator 39 of FIG. 1. A CPU 40 uses a ROM 41 and a RAM 42 to perform a comparison operation between the output of a speed command device (not shown) and the output 6a of the speed detector 6. The output of the speed command device is taken in through an interface circuit 43, whereas the output 6a of the speed detector 6 is taken in through an interface circuit 45. The CPU 40 then outputs the results of the comparison operation to a PWM modulator 47. The output 7a of the electric current detector 7 is taken in by the CPU 40 through an A/D convertor 44. A signal from the contact 38a of the contactor 38 is also taken in by the CPU 40 through an interface circuit 46. While the contact 38a of the contactor 38 is open, a counter 48 counts pulses from an oscillator 49 and outputs them to the CPU 40.

Figure 3:
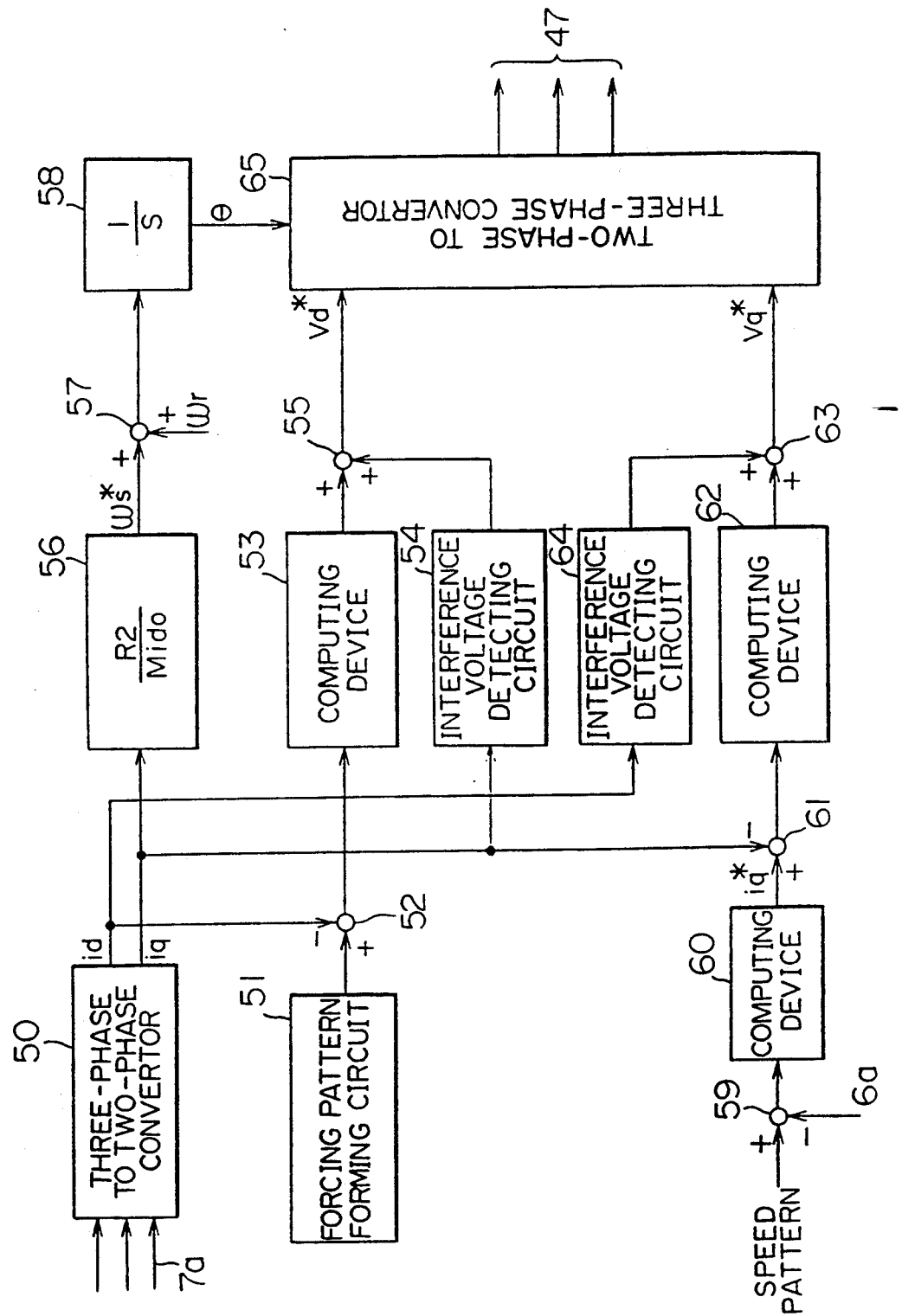
FIG. 3 is a block diagram showing computation performed by the regulator of FIG. 2.

FIG. 3 is a block diagram showing computation performed by the regulator 39 which divides a primary electric current of the induction motor 5 into an exciting current component and a torque current component in order to perform vector control. A three-phase-to-two-phase convertor 50 converts the output 7a of the electric current detector 7 into rotational coordinates rotating at the same rate as secondary magnetic flux. The exciting current component id and the torque current component iq are then detected. A forcing pattern forming circuit 51 creates a forcing pattern of an exciting current. A subtracter 52 computes the difference between the forcing pattern and the exciting current component id. A computing device 53 then performs a PI (programmed instruction) operation on this difference. An adder 55 adds the output of the computing device 53 to an interference voltage from an interference voltage detecting circuit 54 based on the torque current component iq. This addition calculates an output voltage component command Vd* having the same phase as the exciting current component id.

A subtracter 59 determines the difference between a speed pattern and the output 6a of the speed detector 6. A computing device 60 performs the PI operation to calculate a torque current command iq*. A subtracter 61 determines the difference between the torque current command iq* and the torque current component iq. A computing device 62 then performs the PI operation. An adder 63 adds the output from the computing device 62 to an interference voltage from an interference voltage detecting circuit 64 based on the exciting current component id. This addition calculates an output voltage component command Vq* having the same phase as the torque current component iq.

On the other hand, a coefficient multiplier 56 multiplies the torque current component iq by a secondary resistance value R2/Mido (ido being a reference value of the exciting current). This multiplication calculates a slip frequency command ωs*. An adder 57 adds this slip frequency command ωs* to the output of the speed detector 6, or a speed signal ωr of the induction motor 5 in order to calculate an output frequency. An integrator 58 integrates the output frequency to determine an output phase θ. A two-phase-to-three-phase convertor 65 utilizes the output phase θ, the output voltage component command Vd* having the same phase as the exciting current component id, and the output voltage component command Vq* having the same phase as the torque current component iq so as to convert the rotational coordinates into three-phase fixed coordinates. The two-phase-to-three-phase convertor 65 thus calculates a three-phase voltage command and outputs it to the PWM modulator 47.

Figure 4:
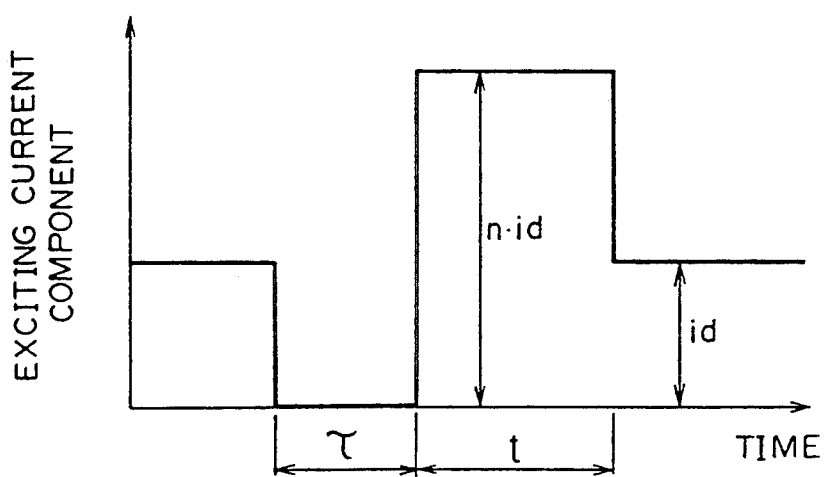
FIG. 4 is a time chart of an exciting current component in the embodiment.

FIG. 4 shows an example of the forcing pattern of the exciting current. The relationship between the exciting current component id and the secondary magnetic flux $\Phi_2$ is as follows:

$$\Phi_2 = \frac{M}{1 + L_2/R_2} id + \phi$$

where $\phi$ = residual secondary magnetic flux

Therefore, if the time during which the contactor 38 is open is expressed as $\tau$, the residual magnetic flux is given by the following equation:

$$\phi = \phi_0 \times \exp(-L_2/R_2 \times \tau)$$

where $\phi_0$ = rated secondary magnetic flux

In FIG. 4, if the magnification of the forcing pattern is expressed as "n," the time "t" for the forcing pattern is determined by the following equation.

$$t = \frac{R_2}{L_2} \log\left(\frac{n-1}{n - L_2/R_2 \times \tau}\right)$$

Figure 5:
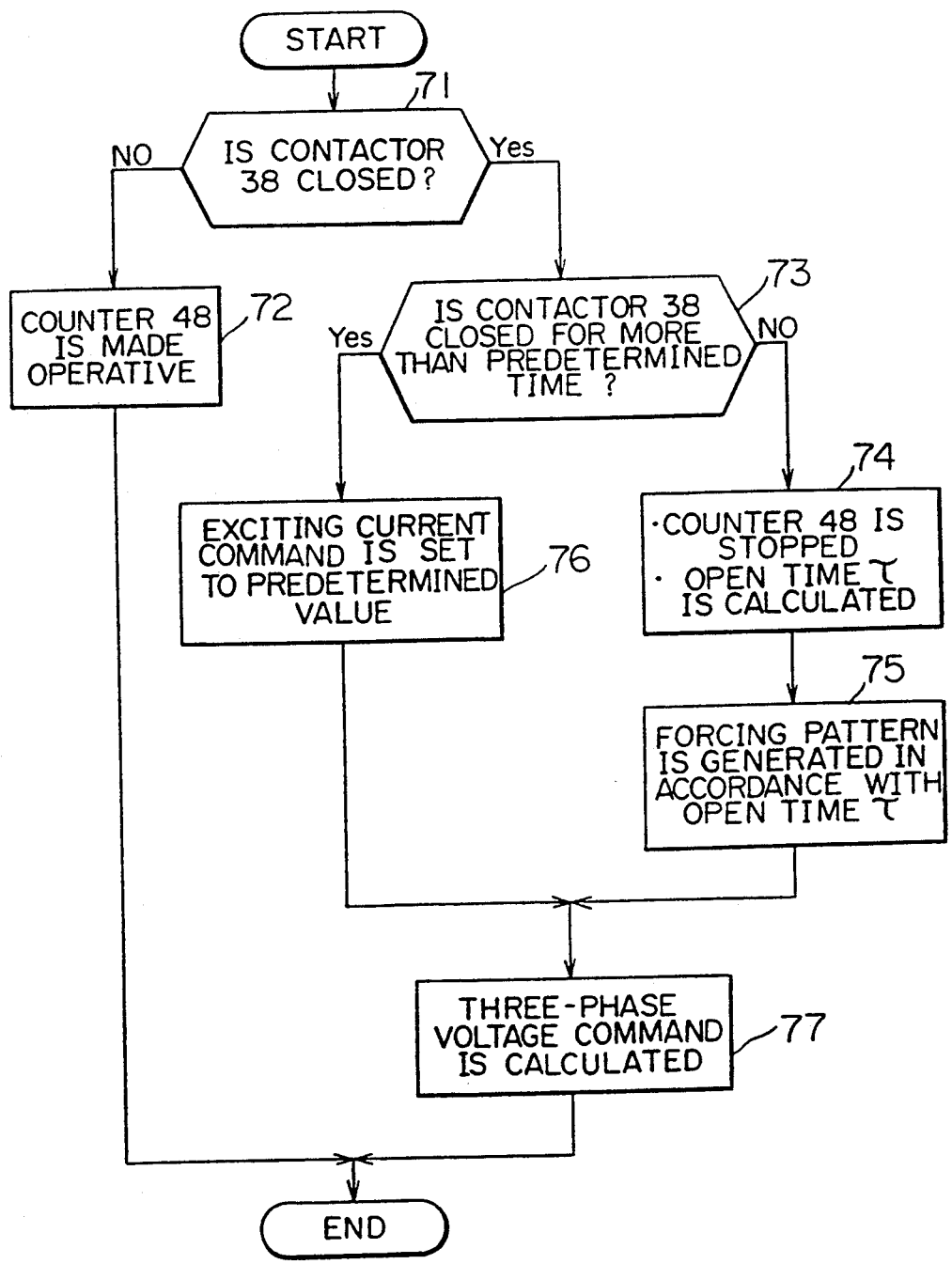
FIG. 5 is a flowchart showing the operation of the regulator of FIG. 2.
Figure 6:
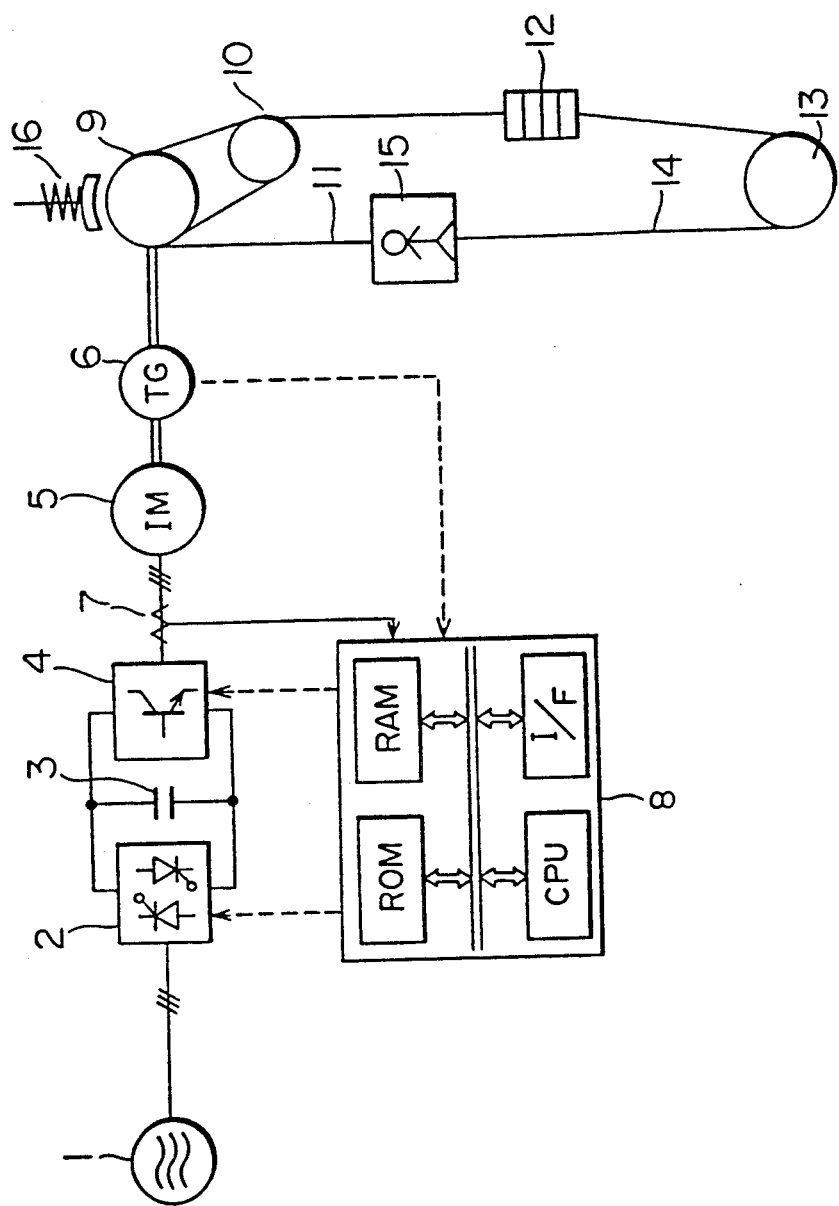
FIG. 6 is a block diagram showing the conventional elevator speed control apparatus.
Figure 7:
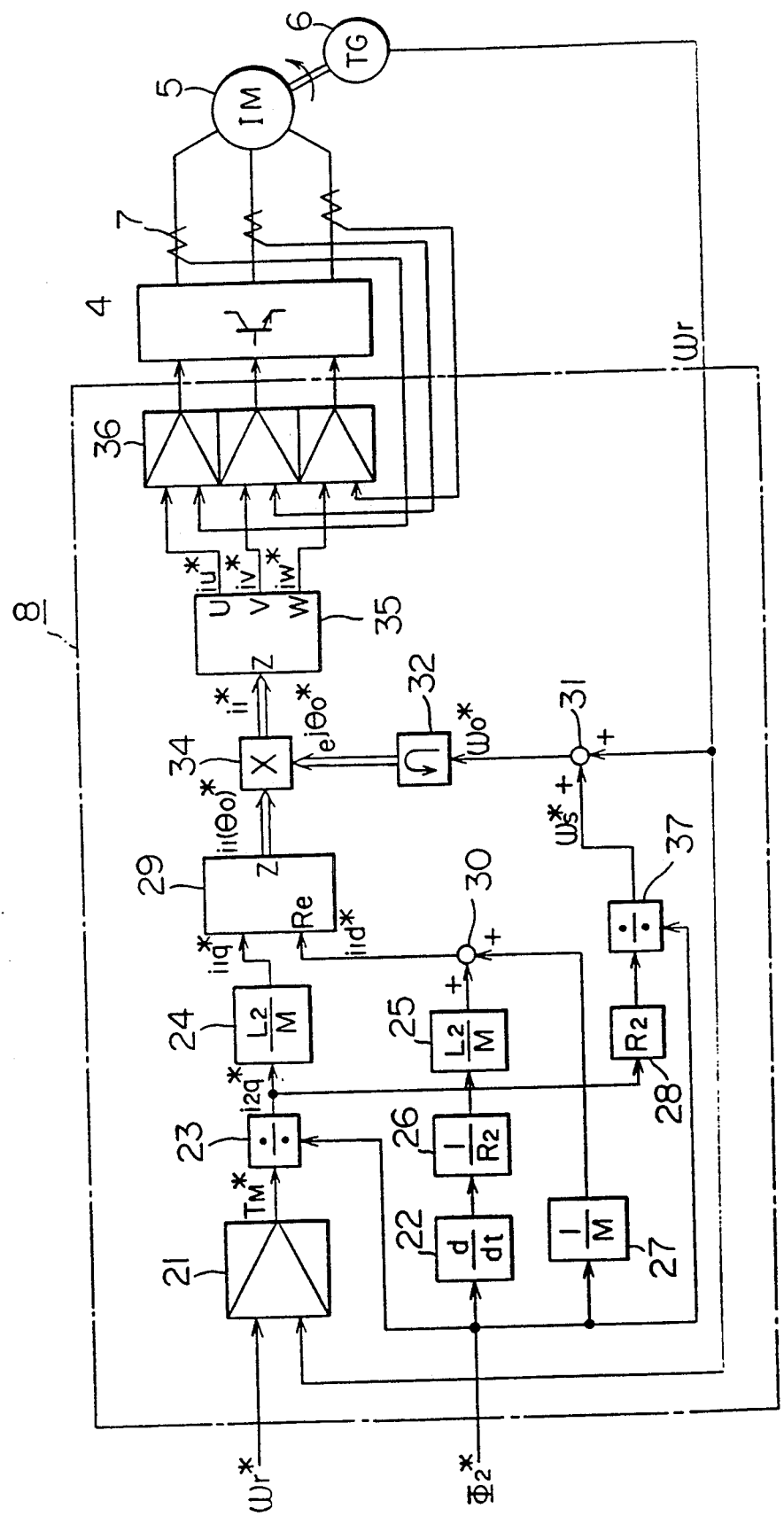
FIG. 7 is a block diagram showing computation performed by the regulator employed in the apparatus of FIG. 6.

FIG. 5 is a flowchart showing the operation of the regulator 39. First, in step 71, it is determined whether the contactor 38 is closed. If the contactor 38 is open, the counter 48 is made operative in step 72. If, on the contrary, the contactor 38 is closed, it is determined in step 73 whether the contactor 38 is closed for more than a predetermined time. If the contactor 38 is not closed for more than the predetermined time, in step 74 the counter 48 is stopped, and the time $\tau$ during which the contactor 38 is open is calculated. Thereafter, in step 75, a forcing pattern in accordance with the open time $\tau$ is formed. In step 77, a three-phase voltage command is then calculated based on the block diagram of FIG. 3.

On the other hand, in step 73, if it is determined that the contactor 38 is closed for more than the predetermined time, in step 76 an exciting current command of the forcing pattern forming circuit 51 is set to a predetermined value. In step 77, the three-phase voltage command is calculated. Since the forcing pattern of the exciting current is thus generated, balance variation does not occur at the start of an elevator.

What is claimed is:

1. An elevator speed control apparatus comprising:
an inverter connected to an AC power source so as to supply an induction motor with current for driving an elevator with a variable-voltage, variable-frequency alternating current;
a contactor provided between said invertor and said AC power source;
magnetic flux computing means for computing a residual value of secondary magnetic flux of the induction motor while said contactor is open; and
control means for dividing a primary current of the induction motor into an exciting current component and a torque current component so as to perform vector control, for changing the magnitude of the exciting current component by an amount equal to an output of said magnetic flux computing means when said contactor is closed, and means for calculating a three-phase voltage based on the exciting current component and the torque current.

2. An elevator speed control apparatus as claimed in claim 1 wherein said magnetic flux computing means calculates, based on the time during which said contactor is opened, the residual value of the secondary magnetic flux of said induction motor.

3. An elevator speed control apparatus which transmits command voltages to a pulse width modulator to control an induction motor, said elevator speed control apparatus comprising:
a regulator including:
a three-phase to two phase convertor which divides primary current from the induction motor into an exciting current component and a torque current component;
means for generating a command signal for the exciting current component;
means for combining the exciting current component with the command signal; and
means for calculating a three phase voltage command to drive the pulse width modulator having a plurality of inputs including the exciting current component, the torque current component and the combined signal output from said means for combining;
a power converter connected to said regulator;
means for supplying current to said power converter;
means for temporarily interrupting current flow to said power converter; and
magnetic flux computing means for computing a residual magnetic flux of the induction motion while said means for temporarily interrupting current flow to said power converter temporarily interrupts current flow to said power converter.

4. An elevator speed control apparatus as claimed in claim 3 wherein said means for generating a command signal generates a signal having a predetermined value when current flows to said power convertor uninterrupted for a predetermined amount of time, $\alpha$.

5. An elevator speed control apparatus as claimed in claim 3 wherein when current flow to said power convertor is uninterrupted for less than the predetermined amount of time $\alpha$, said means for generating the command signal generates the command signal based on an amount of time, $\tau$, for which current has been interrupted.

* * * * *